United States Patent [19]

Pajak et al.

[11] Patent Number: 5,388,196
[45] Date of Patent: Feb. 7, 1995

[54] HIERARCHICAL SHARED BOOKS WITH DATABASE

[75] Inventors: Henry G. Pajak, Ontario; Kenneth C. Byrne, Henrietta, both of N.Y.

[73] Assignee: Xerox Corporation, Stamford, Conn.

[21] Appl. No.: 578,384

[22] Filed: Sep. 7, 1990

[51] Int. Cl.⁶ ............................................. G06F 15/00
[52] U.S. Cl. .................................... 395/153; 395/161
[58] Field of Search ................. 395/153, 155, 160, 161

[56] References Cited

U.S. PATENT DOCUMENTS

| | | | |
|---|---|---|---|
| 4,399,504 | 8/1983 | Obermark et al. | 364/200 |
| 4,543,630 | 9/1985 | Neches | 364/200 |
| 4,604,686 | 8/1986 | Reiter et al. | 364/200 |
| 4,631,644 | 12/1986 | Bachman | 364/200 |
| 5,008,853 | 4/1991 | Bly et al. | 395/153 |

Primary Examiner—Mark K. Zimmerman
Attorney, Agent, or Firm—Ronald F. Chapuran; Thomas B. Zell

[57] ABSTRACT

A representation of a shared structured container type data object with related data bases can be used to present information in a hierarchy or multi-level mode about the activities and status relating to the shared container type structured data object and related data bases and its content of a plurality of structured data objects as well as other information affecting or tracking the shared container type structured data object content in multi-levels. Further, user access control also provides exclusivity or privacy to invoked changes to parts of the shared container type structured data object and related data bases without interference from other users but with an indication to the other users of access control attributes thereby providing coordinated consistency among users relative to changes to all parts of the shared container type structured data object. There is also the provision for sharing a container with related data base and for Quick Query access to the data base allowing the sharing of multiple objects within the container and the capability of populating and querying the various objects within the container as well as within the data base.

10 Claims, 14 Drawing Sheets

FIG. 13A

| SVP Development | Close | Redisplay | Lock | Check In | UnLock | Show Details | Quick Queries |

STATUS NAME | VER | CLASS | DATE | PAGES

☐ Structured ViewPoint PERT | 5 | Body | 20-Jun-89 14:07:08 | 173 Disk Pages

☐ Structured ViewPoint PERT | 1 | Body | ... | 6 Objects

SVP Quick Queries Window | Close | Execute | Copy To Table | Edit Column Order | Project Management Display: | Information Management | SQL Query | Consistency Checking | Graphic Relational Statements Control: Case Sensitive | Distinct Query Selection: Cross Reference | Graphic Object Descriptions Book Name: SVP Development | DataBase Account: OSVPCust File: File Name | ModifiedOn FileType | Modified By Pathname | Book Name | Version Result Table:

| Object Type | File Name | ModifiedOn | Object Name | Responsibility |
|---|---|---|---|---|
| Activity Node | Develop Project Mgmt. & Consistency Checking | 25-APR-89 | Create Quick Queries "Project Management" Window | Eric, Steve, Hank |
| Activity Node | Structured ViewPoint PERT | 20-JUN-89 | Beta Test base functions | Hank |

To FIG 13B

| SVP Book Properties | | | Done | Cancel | | |

Select Book Type | BOOK | SHARED BOOK | SHARED BOOK WITH DATABASE

Book Name: Eclipse Shared Book with Data Base

Owner: ---

Revision: ---          Last Modified: ----------

Number of Contained Items: 0          Size In Pages: 0

Sorted | Unsorted          Name          A-Z | Z-A
                              Version Date Notes:

Remote Location:

Keep All Versions | Limit Number Of Versions To Keep

Data Base Service:

Host Account:

HostPassword:

Data Base Account:

Data Base Password:

Limit Retrieved Rows To: 20

Display 80 characters of LONG data types

Data Base Populated With: All Versions | Latest Version Only

Send ViewPoint Document Fields Info To Database: Yes | No

*FIG. 15*

HIERARCHICAL SHARED BOOKS WITH DATABASE

BACKGROUND OF THE INVENTION

This invention relates to collaboration among users in a networked workstation system, i.e. a real-time computer-based cooperative, multi-user environment, through a multi-user interface. More specifically, the invention relates to the manner in which shared structured, hierarchical containers and data bases are represented, accessed and controlled in a collaborative system.

In a multi-user interface in a collaborative system, there must be an interface utility that permits multi-users to participate simultaneously together and share access to information relative to their participation.

A wide variety of user interface techniques are known for enabling more than one user to access a structured data object. In some techniques, a structured data object is only displayed to one user at a time, while in others, a structured data object is displayed to a number of users at the same time.

The term, "structured data object", is used herein to generically mean a data object that contains a series of other data objects linked together in a predetermined manner which may or may not include a visual representation or functional abstraction on a display screen. Such data objects may have an associated set of operations and be linked to one another for one or more functional purposes. An example of a structured data object is the electronic version of a multi-page document wherein each page is a data object linked to both preceding and subsequent pages, which are data objects, in a predetermined order. Another example is a workspace or desktop, as defined by the display screen containing multiple structured data objects, e.g., file folders or documents, which, in turn, may contain other structured data objects. For example, a file folder may contain several documents, other file folders or a file drawer. A structured data object that is capable of holding other structured data objects is also referred to in the art as a "container", e.g., a file folder is a container for documents. Another example is hypertext linked structured data objects wherein individual workspaces or text windows, themselves may be linked together in a predetermined manner. In U.S. patent application, Ser. No. 030,766, filed Mar. 25, 1987, entitled, "User Interface With Multiple Workspaces For Sharing Display System Objects", assigned to the assignee herein and incorporated herein by reference thereto, the term, "structured data objects" would include "display objects", "container" and "display system object" as defined therein.

The present invention deals with the employment of structured files in a shared multi-user environment, in particular, a hierarchy of containers and documents containing structured data objects such as tables, fields, graphics, and data attachments with related data bases that are shared and easily accessed. The selective exclusion of containers and documents is also included. In this context, the term "shared structure object" has reference to files and the structured data objects within them that are accessible to more than one user through network coupled display workstations.

As is known in the art, the representation and display of structured data objects in a workstation environment may take various forms. A common technique is to present the contents or entries of structured data objects in a display region or workspace, such as a view window, on a CRT display. In order to maintain an unclustered display area in the displayed setting, however, it may be useful to provide a shrunken or small representation of the structured data object, such as an iconic representation, when a user is not engaging in activities relating to the structured data object. Such a representation of data may take the form of iconic representations of different structured data objects positioned on a workspace of a display screen, e.g., a display illustrating an office desktop metaphor employing various abstractions of a typical office environment, representative of real office objects, both physically accessible directly while seated at a desk or only physically accessible by moving from a desk to another office location away from the desk. Examples of these abstractions are a desktop, inbasket, outbasket, documents file folders and "books", which contains two or more consecutive document portions which together comprise a complete document. An example of such an office metaphor is the ViewPoint TM ("VP") software system available from Xerox Corporation in connection with its 8010 and 8065 display workstations. A more detailed description of this system and iconic representation therein is found in U.S. patent application, Ser. No. 856,525, filed Apr. 28, 1986, assigned to the assignee herein and incorporated herein by reference thereto. This application also contains subject matter related, in certain aspects, to the subject matter of patent application Ser. No. 127,814 (D/87009), filed Dec. 2, 1987, entitled, "Small-Scale Workspace Representations Indicating Activities by Other Users", assigned to the same assignee herein and also incorporated herein by reference thereto.

A "book" in the ViewPoint software system is a structured data object of the container type and is a special directory that creates a relationship among the document portions that are contained in the book. Consecutive documents in a book can share a single page number series so that each document or a selected order of selected documents in the book automatically inherit sequential page numbering proceeding from document to document of the book. Also, scrolling from one document will automatically continue into the next sequential document. Further, there is a facility to automatically create a table of contents and index for the book which will automatically include content and indexing material into the table and index created relative to each document in the book. Lastly, the book will print as a single document.

The ViewPoint ("VP") software system includes a form of "shared" structured data objects in the form of the file drawer abstraction, described in "Filing", *VP Series Reference Library*, Version 1.0, Xerox Corporation, 1985, pp. 1–60. As described at pages 4–7 and 20–21, a file drawer stores information on a remote file server, which is a physically remote accessible device so that the iconic representation is referred to as a reference icon on the desktop and is shown in half tone to represent this remote state. Structured data objects, such as file folders and documents digitally stored in a file drawer, can be shared by many users, in accordance with access rights, as illustrated at pages 40–43, i.e., users with access rights can access copies of data objects from the same file drawer. A file drawer is represented on the display by a relatively small icon with a pictorial file drawer representation with a name appearing within the representation. As explained in patent application Ser. No. 856,526, a sequence of keyboard and mouse signals, the user can select the icon and request an <OPEN> operation, in which case a window appears on the display workspace showing the file drawer contents, as described and shown at pages 9-10 and 32-34. Unless covered by a window, the file drawer icon remains visible in shadow form while file drawer window remains in its opened state. The user can subsequently close the file drawer window, in which case, the window disappears and the icon resumes its original solid iconic appearance. The ViewPoint system also includes other reference icons described at pages 11-15, 22-25 and 49-60, which can also be used to access a "shared" structured data object.

Thus, relative to "shared" structured data objects located in a remote digitally storage facility or file service represented as a file drawer abstraction of the desktop, it is important to note that access of a structured data object is possible by multiple users having proper access rights to the file drawer for placing a digital copy of a structured data object on the user's desktop for subsequent manipulation, editing, revision, insertion of new material, etc. In this sense, several users may access and share the same data or the same structured data objects, but individual users would be unaware of any changes made by other users unless other users restored the modified version of the structured data object back into the same file drawer and, further, other users periodically checked to see if and when an updated version of the structured data object may have been so restored, absent an electronic or phone message to other users informing them of the restored revision.

The prior art also includes U.S. Pat. No. 4,399,504 to Obermarck et al. discloses a method and means for the sharing of data resources in a multiprocessing, multiprogramming environment wherein a matrix to determine compatibility between two user's requests is shown. See col. 6, lines 38-54. A variable, DBRC, keeps track of the databases usage. See col. 9, line 31-col. 10, line 5. A method to control multiple concurrent accesses to data is shown. See col. 29, lines 49-66.

PRIOR ART

U.S. Pat. No. 4,604,686 to Reiter et al. discloses an associative data access method (ADAM) and its means of implementation wherein a user interface is shown. See col. 4, lines 14-34. A file structure is shown which allows the user interface to operate in a particular database. See col. 4, line 52-col. 5, line 13.

U.S. Pat. No. 4,543,630 to Neches discloses a data processing system and method wherein a multiprocessor system with individual user's relational databases is shown. See col. 7, line 65-col. 8, line 4. A method of prioritizing messages from nodes is shown. See col. 11, lines 10-62.

U.S. Pat. No. 4,631,664 to Bachman discloses a partnership database management system and method wherein access levels of an application are shown. See col. 5, line 48-col. 6, line 21. A method to link and unlink two records is shown. See col. 7, line 2-col. 8, line 35.

It is also known in the prior art, as disclosed in copending patent application D/87280, U.S. Ser. No. 127,993 to provide a representation of a shared structured data object can be used to present information about the activities and status relating to a shared (non-hierarchical) structured data object and its content as well as other information affecting or tracking the shared structured data object content. Further, user access control also provides exclusivity or privacy to invoked changes to parts of the shared (hierarchical) structured data object without interference from other users but with an indication to the other users of access control attributes thereby providing coordinated consistency among users relative to changes to all parts of the shared (non-hierarchical) structured data object.

A difficulty, however, is that there is no facility in ViewPoint for sharing containers with related data bases, nor for sharing containers in a hierarchical manner. Nor is there in ViewPoint the provision for a Quick Query access to containers and their files and the contents of the files with data base access and for sharing information concerning the status and tracking of revisions created by other users to a container with related data base. This severely restricts the shared and data access feature versatility of the system. Sharing a container with related data base and quick access to the data base allows the sharing of multiple objects within the container and the capability of populating and querying the various objects within the container as well as within the data base.

It is a principal object of this invention to provide a means in the form of a representation indicative of the status of and tracking changes to a hierarchy of shared structured data objects with related data bases accessible in a Quick Query mode as a multi-user application in a realtime collaborative environment.

SUMMARY OF THE INVENTION

According to this invention, a representation of a shared structured container type data object with related data bases can be used to present information in a hierarchy or multi-level mode about the activities and status relating to the shared container type structured data object and related data bases and its content of a plurality of structured data objects as well as other information affecting or tracking the shared container type structured data object content in multi-levels. Further, user access control also provides exclusivity or privacy to invoked changes to parts of the shared container type structured data object and related data bases without interference from other users but with an indication to the other users of access control attributes thereby providing coordinated consistency among users relative to changes to all parts of the shared container type structured data object. There is also the provision for sharing a container with related data base and for Quick Query access to the data base allowing the sharing of multiple objects within the container and the capability of populating and querying the various objects within the container as well as within the data base.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 13A and 13B show a Quick Query window and data attachment window in accordance with the present invention;

FIG. 15 is a representation of a Shared Book with Data Base Property Sheet in accordance with the present invention.

DETAILED DESCRIPTION OF A PREFERRED EMBODIMENT

Figure 1:
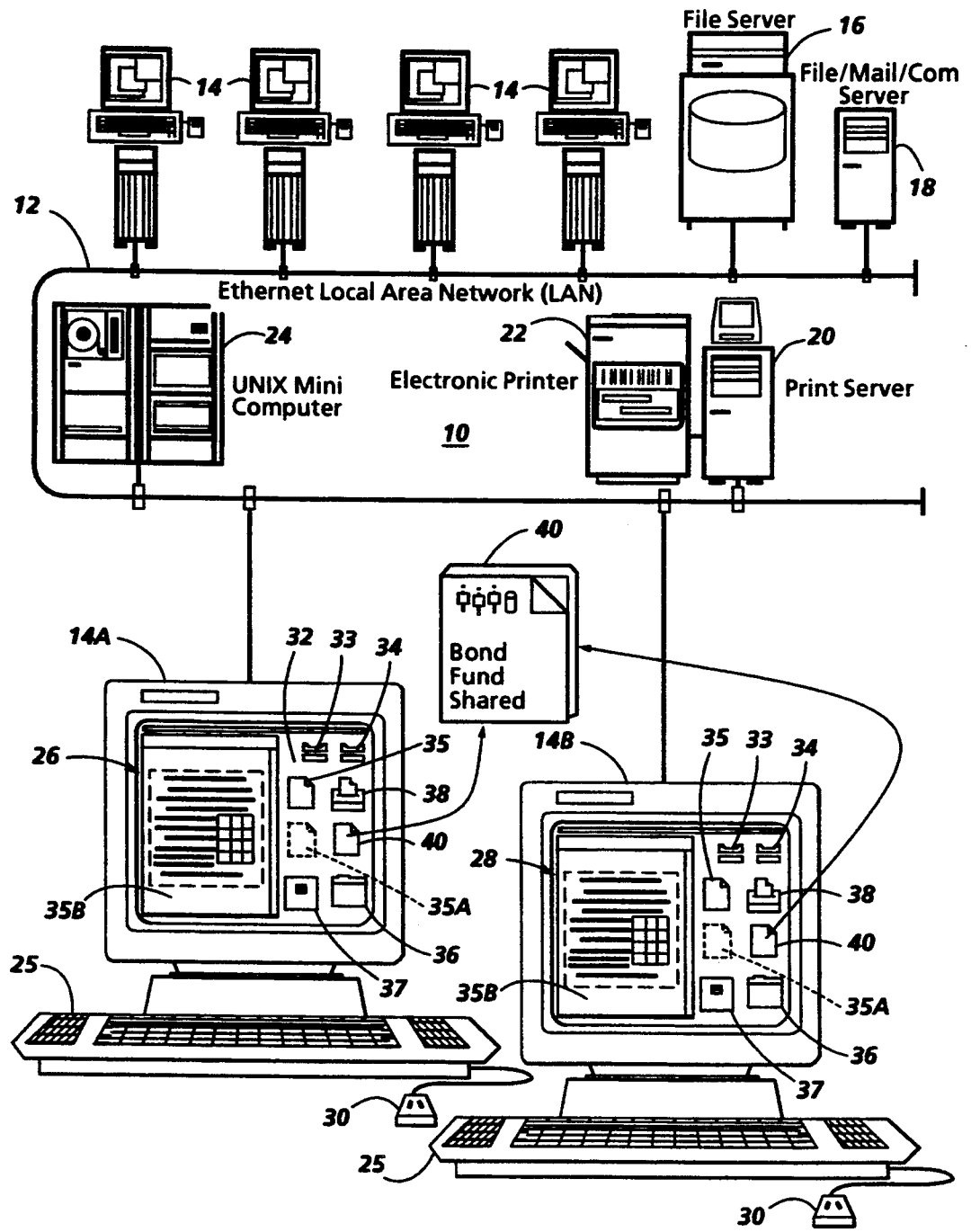
FIG. 1 is a diagrammatic illustration of an office information system illustrating shared structured data objects.

General features of this invention can be understood with reference to the figures in explaining in detail the collaborative environment of this invention utilizing a shared structured data object such as could be used in a variety of systems such as a hypertext type system, e.g., NoteCards or a hierarchical database retrieval system or a publication management system.

The collaborative system of this invention invoking a structured data object representation supports a multi-user document processing environment. A typical office information system consists of a number of workstations linked by Ethernet local area network to shared file, communication, and print services. Each workstation has its own local file system. Sharing is done using files stored on file services but files must be manually copied between workstations and servers. The system also has a distributed electronic mail system. These existing facilities help in preparing documents, but they still require manual and coordinated effort and, therefore, are subject to error, particularly relative to information about status and coordination of efforts.

Copending, coassigned U.S. patent application Ser. No. 07/570,984, which is a continuation of Ser. No. 07/127,997, entitled "Multiple Shared Virtual Workspaces", and incorporated herein by reference, relates to the sharing of information and workspaces in a collaborative environment. In addition to the explanation set forth in that patent application as well as in U.S. pat. No. 4,974,173, the present invention involves the notion of a particular representation of shared structured data objects. The term, "shared structure object" is used herein to refer to any structured data object that is accessible to more than one user. A representation of a shared structured data object is any way of displaying shared data represented by the object and its contents, whether as a simple display object, as the contents of the entire display screen, or as the contents of any workspace, whether the workspace is thought of as a room, a window, a blackboard, a sketchpad, a spreadsheet, a card or any other type of entity for presenting data within an area of a display. A representation may be at full scale, occupying a substantial part of the display area, in which case the details of the shared data will ordinarily be visible to a viewer, albeit in some mapped form, such as, a sequence of characters or a bitmapped graphical object. Such a body of shared structured data objects may be amenable to many different full scale representations, as when a document can be displayed page-by-page in a desired sequence. A representation may also be at a small scale, occupying a small part of the display area, in which case, the details of the shared structured data object may not be visible. A small scale representation may also be a small portion of the full scale representation of the same shared data, showing details relating in specific ways to or attributes of the shared structured data object; it could be a shrunken version of the full scale representation of a structured data object, showing some general features of the full scale representation but omitting details; a reduced scale representation could also be an icon or other small display abstraction that shows virtually none of the features or attributes of the full scale representation other than an identifier such as a name or configuration of a structured data object.

The above mentioned recognized capabilities are achieved in a multi-user collaborative system in which the contents as well as the current status of other user activity of a shared structured data object in a hierarchy format with related data bases representing one or more related structured data objects in the form of data entries can be concurrently accessed by different users respectively at different workstations connected to a common link. The user interface representation of the shared structured data objects includes an ordered listing of such entries that are maintained by the structured data object and various attributes of each listed entry, inter alia, the type and class of entry; the revision number of the shared structured data object; the number of pages and revision number of each structured data object entry; the date of creation and last revision of each such entry; whether an entry can be accessed by a user and, if not, who has prevented such access; whether a local instance of an entry is present on a user's system; and a provision for miscellaneous notes or comments relative to each entry for view by other users.

A procedure is provided for maintaining current information relative to the shared structured object and its entries on a user initiated demand updated basis invoked by a user operation, which operation requires updated information to properly implement the operation. Further, means is provided for locking up one or more data entries by an individual user and thereby prevent access of the locked entries by other users to prevent concurrent editing and other changes to the same entries by two or more users. In this connection, editing or modification cannot be performed by a user until the shared structured data object entry or entries have been locked up. Visual indication as to the locked state of entries and other information relative to the locking user and the time of lock is updated and displayed in the shared structured data object representation present at user workstations when a user invokes a user operation on the shared structured data object or its contents. In this manner, the updating of the representation is completely decentralized and client-based so that it is not necessary to monitor the number and currency of shared structured data objects existing throughout the network but, rather, updating of the representation of object content, as well as any modified data content of structured data objects, is accomplished upon individual user initial invoking of a structured data object operation.

Figure 2:
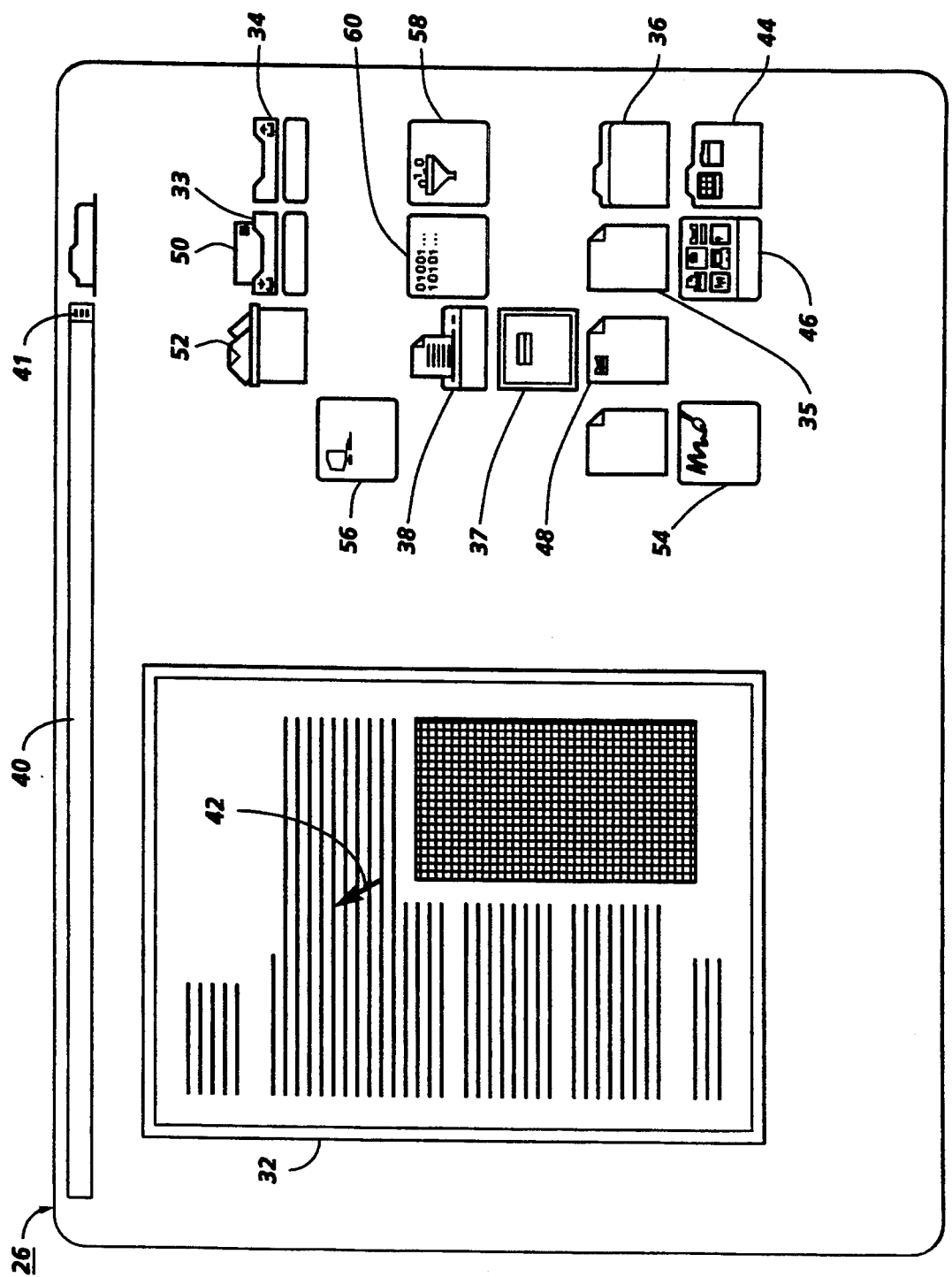
FIG. 2 is an enlarged view of a display screen as shown in FIG. 1.

Reference is now made to a typical office information system 10 illustrated in FIGS. 1 and 2. System 10 includes an Ethernet local area network (LAN) 12, to which a number of user workstations 14, including workstations 14A and 14B, are connected. Workstations 14 may be, for example, the Xerox 6085 professional workstation. LAN 12 may also have other office connected equipment such as network file server 16, network file/mail/communication server 18, printer server 20 and printer 22. Also, a large capacity remote storage facility, such as a UNIX mini computer 24 may be connected to LAN 12. System 10 is a collaborative type system, meaning that it enables users at different workstations 14 to work together in real-time by processing and passing information among one another and storing and retrieving information from storage services 16 and 24 via network 12. The collaborative functions of system 10 could also be centralized in a single main CPU, could be distributed among processors at the workstations, or could be provided in any combination of centralization and distribution. Similarly, LAN 12 could take any appropriate configuration capable of providing the necessary communications to support collaboration.

System 10 includes display-based user interfaces, with each workstation 14 including a display device and a user input device. In this connection, workstations 14A and 14B illustratively include respective CRT display screens 26 and 28 and keyboards 25, each with a display cursor mouse 30. System 10 includes an object oriented display system that comprises iconic representations of different structured data objects positioned on a workspace of a display screen, e.g., a display illustrating an office desktop metaphor employing various abstractions of a typical office environment, representative of real office objects. An example of such an office metaphor is the ViewPoint TM ("VP") software system available from Xerox Corporation in connection with its 8010 and 8065 display workstations. Examples of these abstractions in FIG. 1 are a desktop 32, inbasket 33, outbasket 34, documents 35 and 35A, file folder 36, file drawer 37 and printer 38. Document icon 35A is shown "opened", in that an <OPEN> command has been invoked and opened window 35B has appeared displaying the document in full scale. Printer 38 is an iconic representation of printer 22 on LAN 12. Any document 35 moved, via a <COPY> command from keyboard 25 onto printer icon 37 and the document will be printed at printer 22. Electronic mail is received and sent via a workstation inbasket 33 and outbasket 34, respectively, from and to other workstations on LAN 12 or to workstations on other networks via File/Mail/Com server 18.

The desktop 32 of workstations 14A and 14B also include a shared structured data object 40, which is shown in larger detail between workstations 14A and 14B. This shared structured data object corresponds to a container of related structured data objects, and the data content of the related structured data objects enable users at different workstations to work together in real time. The contained bodies of related structured data objects need not be mutually exclusive. The shared structured data object 40 is also hereinafter referred to as a "shared book", taking the basic attributes of VP "books", explained in the Background of the Invention. Like a VP book, a shared book 40 is a container that has a plurality of related structured data objects which are called entries, e.g., VP documents and/or Interpress masters or files. Shared book 40 is shown in half tone, indicating that it is a reference icon having a remote location on a remote file service, such as file server 16. However, the implementation of shared books is client-based and runs on workstations 14.

In the particular embodiment here, shared book 40 shown in FIG. 1 is a local instance of the shared data comprising a multi-part publication identified as a "Shared Book". A local instance of shared book 40 may appear at several workstations 14. A user's interaction with shared books 40 is designed to be as conventional as possible with the VP metaphor. Standard operations with which the user is already familiar, such as copying and editing of documents, work the same way relative to his shared object as they do on desktop 32.

Shared book 40 has its own window representation 42 and the various types of property sheets, to be discussed, and have been designed to convey a maximum amount of useful information in an easily readable format. An entry 44 within shared book 40, e.g. a VP document, is exactly the same instance as when the entry is on desktop 32. The usual editing, copy, move, and delete operations of VP may be applied as long as the user has the proper access an entry 44 in shared book 40. A user's access to shared book 40 and its contents comes in two forms. The first form is the standard access rights of read, write, change, and delete permission known in VP world. A user may not open or view the contents of a particular shared book without at least read access rights.

The second form of access rights is specific to the shared books implementation and is a direct consequence of its multi-user environment. Each shared book 40 must be protected from multi-users simultaneously changing its contents or its properties. This is necessary in order to prevent different users from overwriting each other's changes or revisions of shared data. This second form of access is extended to shared book 40 as a whole, which is an important aspect of this invention. A file service consists of a digital storage facility to store large amounts of information in digital form and the database manager is a computer program facility for accessing, reading, writing and searching records in the database. A "record" is a basic data entry unit of a database. Each record contains a number of "fields" which store information about the content of a record or the record content per se. A number of similar records, therefore, comprise a "database", also referred to as a "file". A "transaction" is a set of steps or procedures which take the database, or a record therein, from one consistent state to another consistent state by modifying the fields of one or more records. Using one of the above mentioned file systems, it is possible to lock out a record being accessed and used by a user while all other records remain accessible to all other users.

Each shared book 40 at the time of its creation has its own record registered with a file service. A file service supports one or more databases of records. In shared books 40, a record is a named property list or a number of "fields" within a particular database, i.e., a list of attributes characteristic of a record, such as remote file, names, checking in and checking out files from the database and by whom. Each of the properties on the list is tagged with a name. The file service supports applications that do simple queries and edits on these records and the actual properties contained within each record are, therefore, determined by the particular application. With respect to the shared books application, some of the properties for shared books 40 are the shared book's name, its file service, its file service database, its user access list, the number of remote versions of each shared book entry to be maintained on the file server and notes regarding the entries.

A database on a particular file service is specified by the user at the time a new shared book is created. Thereafter, the file service assigns to shared book 40 and each of its entries 44 a distinct record and registers the record with this database. The file service then keeps track of which entries 44 are locked and by whom. Users cannot explicitly lock shared book 40 per se, but certain user operations, such as pagination, can cause shared book 40 to be locked for a brief time as against all users. This prevents two users from simultaneously changing the content or attributes of shared book 40 during such an operation. Typically, each organization will share a single database. Each file service, such as file server 16, can support several distinct databases. Each database can support multiple shared books 40. Every transaction to be performed in connection with shared book 40 checks first to determine whether the shared book's record is available. If it is not, then shared book 40 is determined to be locked and the transaction terminates. If the shared book record is available, then the transaction can proceed with shared book updating, if necessary, and further user invoked operations. Locking and unlocking a shared book's record is accomplished automatically and is invisible to the user, i.e., the users receives no visual indication of file locking or unlocking other than an indication of failed action indicative itself of a current locked state.

As previously indicated, shared book 40 resides in a particular subdirectory or database on a particular file service, such as file server 16. A user specifies the remote location where shared book 40 is to reside at the time the user initially creates a particular instance of a shared book 40 from a blank shared book prototype. Shared book 40 and all of its related structured data objects or entries therein will be maintained at this specified location. The shared books application automatically stores such entries to and retrieves entries from a specified file server 16.

A blank shared book icon can be electronically retrieved from a prototype folder in the directory icon on desktop 32. The directory icon is explained in detail in U.S. patent application Ser. No. 856,525. The prototype shared book icon cannot be opened to view its contents until the properties of a shared book have been properly assigned to the object via a property sheet. A property sheet can be obtained by invoking a <PROP'S> key from keyboard 25. Such a property sheet and the invoking thereof is explained in detail in U.S. patent application Ser. No. 856,525. The sole purpose of blank shared book is to enable the user to create new shared books and to obtain local instances of previously created shared books. The name "Blank Shared Book" is reserved for this prototype so that when a shared book is created, a different name must be given to prototype.

A shared book may contain many different types of structured data objects. This allows the user to maintain in one location both the files that make up a publication and the publication support files. Among the permissible types of such objects that may be placed in a shared book are VP documents with graphics, VP documents of simple text, ASCII and Wordstar files, mail notes, spelling and hyphenation dictionaries and VP spreadsheets. Two types of structured data objects are not allowed in a shared book. Shared books do not have hierarchical capabilities, hence container type structured data objects may not be placed in shared book. This class of structured data objects includes folders, record files, books, and shared books themselves. The second kind of structured data objects that are not allowed in shared books are reference icons.

The message area is the header at the top of screen for displaying system messages to a workstation user. In the example shown there is an indication of the number of free pages left on an associated disk drive. Other messages would be prompts to suggest the next action to be taken by a user such as involving a <MOVE> command from moving an object to another place on the screen and display of the message in the header, "Please specify a destination". The triple bar symbol at the end of the header is a transient or pop-up menu activated via the mouse pointer button held in its down position, thereby visually producing a menu which contains a list of command items which may be, for example, such items as "Date and Time", "End Session" (logoff), "Spelling Checker", etc. These subcommands are involved by moving the cursor pointer with the button still held in its down position over a selected item, which is then highlighted to indicate to the user its potential selection. At this point, if the button is released by the user, the selection is accomplished, the popup menu visually disappears and the command item selected is initiated.

Other commands for performing functions may be invoked from the keyboard. These functions include <DELETE>, which will delete the object and its contents, <COPY> which will copy the object and its contents to another desktop location, <MOVE> which will move the object and its contents to another desktop location, <PROP'S> which will open a window displaying properties or parameters for a particular object and provide alternative choices for these parameters and <OPEN> which opens an object to reveal the contents of the object in a window, if the object is designated to have a content, for example, a document content.

The icons on desktop 32 are aligned vertically and horizontally according to an invisible orthogonal grid. Thus, the icon placement on desktop 32 is not arbitrary and the application software is capable of determining and keeping track of the location of icons on the surface of desktop 32. The locations of each square in the desktop grid are listed in the desktop software so that at any given time, the desktop application can determine the X, Y location of icons on its surface and also help to determine whether the positioning of one icon on top of another on the desktop is a permissible function. For example, the dropping or releasing of a document icon onto a file folder icon or on a printer icon, are both permissible functions; the dropping of one document icon onto another document icon is not a permissible function.

Many of the icons may be opened via the <OPEN> function to reveal their content, such as a list or directory of files or the content of a document. In this sense, the icons are containers representing pointers to files and other bodies of stored data. One Icon is a directory divider which when opened contains a plurality of directory icons. One directory icon serves as a source of icons representing shared and remote objects that the user may access, such as filing and printing services.

There is also the feature of Shared Books with Data Base, that is, the same shared capability as Shared Books but "attributes" of files and their contents are included. For example, fields and their content, filing name, who modified them and when, as well as graphic and data arrangements are also populated to a central data base for easy access and querying. Shared Books allows folders to be added to the books as support. Shared Books are created from a simple "Blank Book" icon available in the workstation directory file on the desktop.

There is provided a data base access or Quick Query window integrated into the window interface of Shared Books with Data Base and backing the data and files associated with the Shared Book and Data Base. One or more Shared Books with Data Base are considered to form a shared library to be queried by quick query operations. There are several ways of accessing the Quick Query windows, for example, by chording over a closed Shared Book or file with Data Base. The window can also be accessed from the auxiliary menu of a Shared Book with Data Base or from the window header menu of a reference icon to a Shared Book with Data Base.

The Quick Query window or technique offers a simple but very powerful method of accessing much of the information contained in documents and about other files that have been checked into a Shared Book with Data Base. The window provides the ability to search information across many books by using icons and filling in query criteria without the need to write SQL statements. Information Management, one of the choices available, allows quick access to data that falls into categories such as files organized into books, filing information such as names, file types, creator's modification dates, etc, graphic models for all notations—such as objects and connections and the data base attachments and fields information including field name, type and first 240 characters of the content. The output is organized in tables that can be made into document tables. The techniques can also be used for creating reports for data contained in documents, for accessing classical data dictionary information, finding information "buried" in documents as well as finding the connectivity of graphic models. The system automatically connects with an ORACLE ™ data base anywhere the database is located.

There is a great deal of information maintained on the ORACLE ™ database that is accessed that "backs" each Shared Book with Data Base. This window allows the system to easily combine the query across each category of information. In the Information Management window, for example, fields are available that contain the book names and the associated data base account names for those books to be queried. The system can query across as many books as desired and this is especially useful where the files in each book have a common querying field, e.g., attachment column, file name, and any of the fields that are part of Quick Queries.

Figure 3:
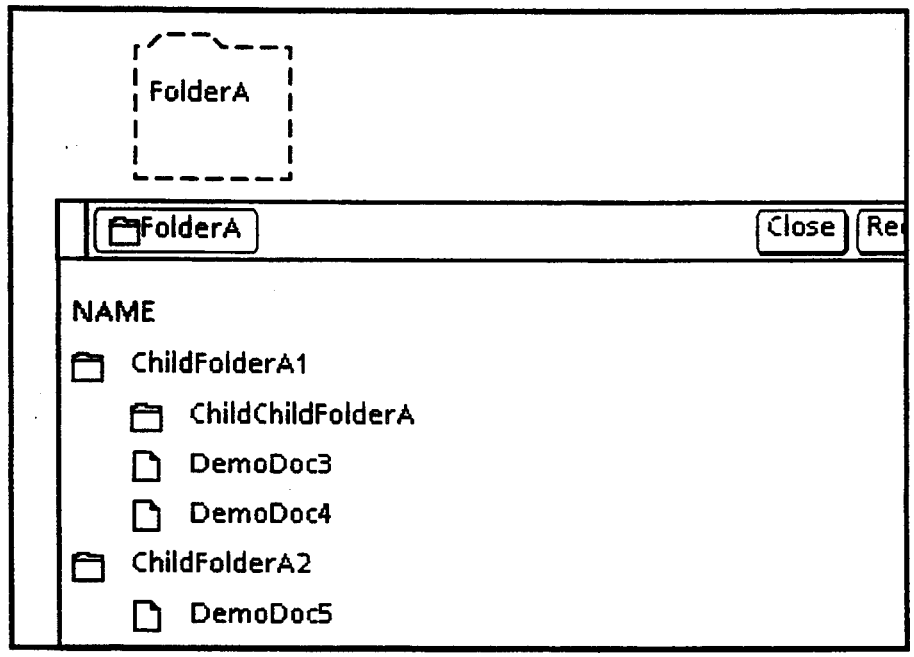
FIG. 3 is a representation of the accessing and displaying of nested hierarchical files in accordance with the present invention.
Figure 5:
FIG. 5 is a representation of the accessing and displaying of files using a folder pop-up menu in accordance with the present invention.

A hierarchically Nested Display is provided. That is, to make an entire nested structure of folders and other icons easy to observe, both a folder and the icons inside it are displayed in the same window, indenting the names of the icons inside the folder, in an outline style as illustrated in FIG. 5. For example, as shown in FIG. 3, the displayed FolderA not only illustrates the files and documents contained within FolderA, ChildFolderA1, ChildFolderA2, DemoDoc1 and DemoDoc2 (illustrated in FIG. 3) but also displays the sub files in each of the first level of files in indented form. That is, ChildFolderA1 is displayed as containing indented sub files ChildChildFolderA, DemoDoc3, and DemoDoc4, and ChildFolderA2 is displayed as containing sub files DemoDoc5 and DemoDoc6. Thus, the entire nested structure can be displayed and visualized without obscuring any of the files. This nested display can be carried to multiple levels. That is, if ChildChildFolderA contained sub files, these files could also be displayed in indented form under ChildChildFolderA.

Figure 4:
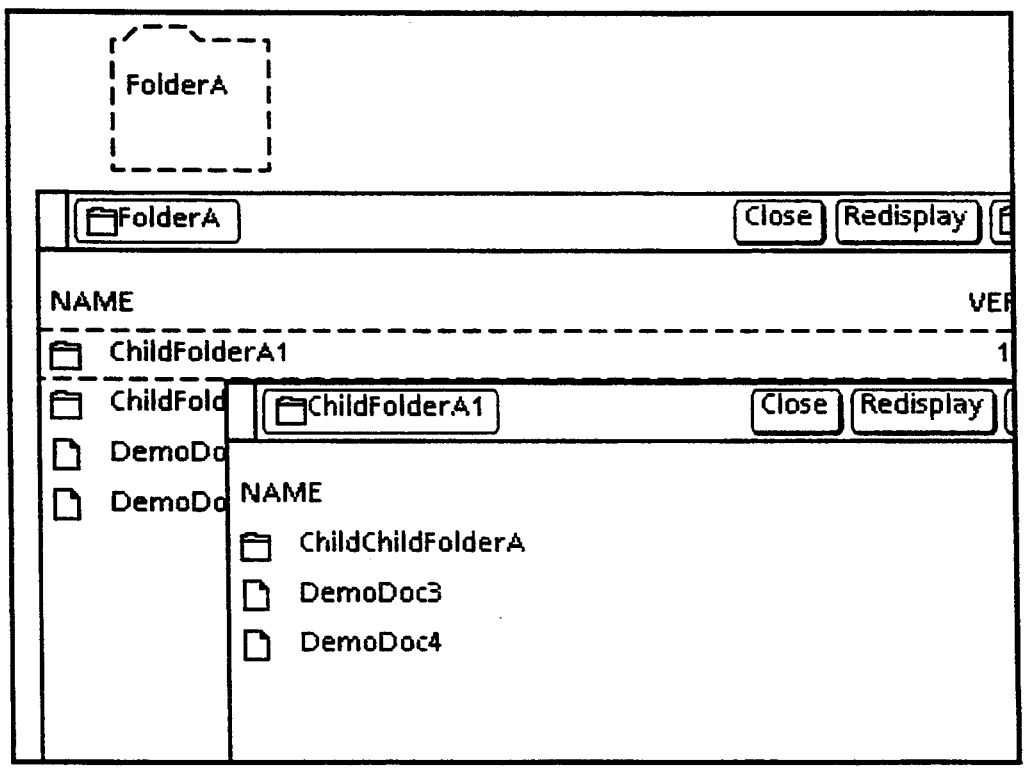
FIG. 4 is a representation of the accessing and displaying of hierarchical files into separate windows in accordance to the present invention.

Files or icons can be opened into a separate window rather than having an open icon or file completely obscure the window from which it was opened, as illustrated in FIG. 4. A first window displays the contents of FolderA, namely ChildFolderA1, ChildFolderA2, DemoDoc3 and DemoDoc4. This is the same display as shown in FIG. 3. However, if the work station professional desires to display the contents of one of the files or documents in FolderA, for example, ChildFolderA1, the contents of ChildFolderA 1 are displayed in a separate window. As illustrated the files ChildChildFolderA, DemoDoc3, and DemoDoc4, contained within ChildFolderA are shown in a second window offset from the window containing the contents of FolderA.

Figure 6:
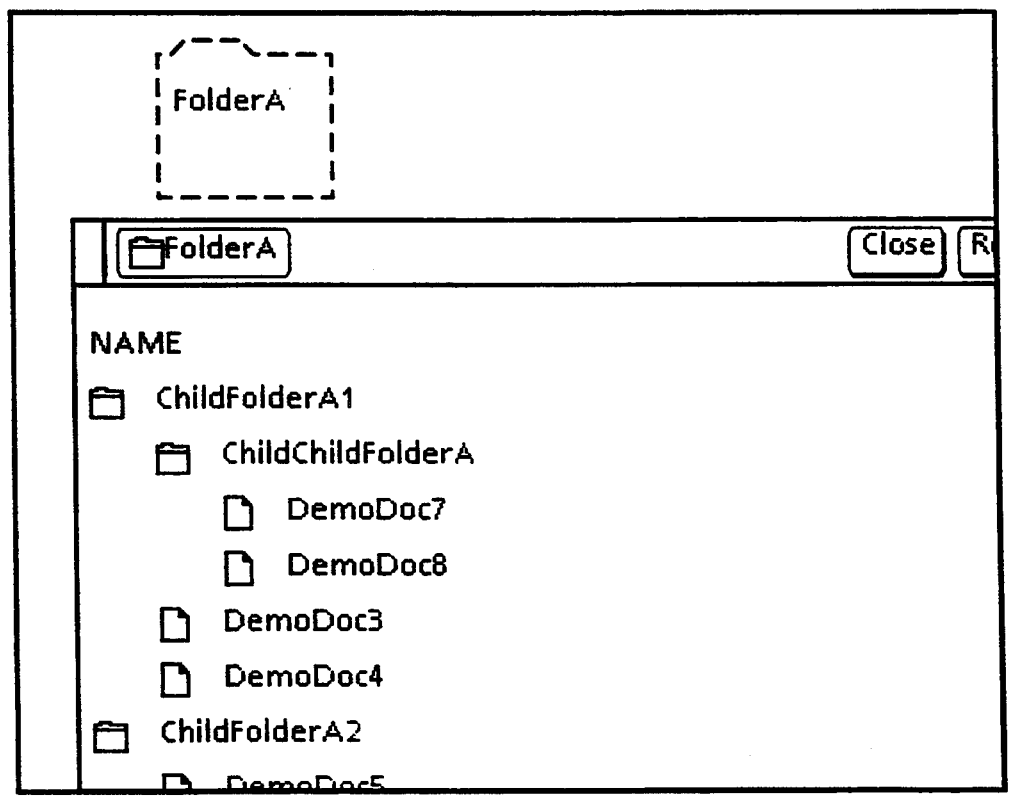
FIG. 6 is a representation of the accessing and displaying of files displayed at "one more level" in accordance with the present invention.

This display can be contrasted with prior art displays, wherein the window showing the contents of ChildFolderA1 obliterates the window showing the contents of FolderA. The second window gives the work station professional a nested display, thus a more comprehensive visualization of the relationship of files and documents. It should be understood that it is within the scope of the present invention to provide additional levels of separate windows containing further delineation of files, subfiles and documents. Folders and file drawers open as before, showing just the icons directly inside. To display icons within the icons in the open folder or file drawer window, a folder pop-up menu in the window header 40 is accessed by use of cursor 42, illustrated in FIG. 5. Various options are then available to the workstation user. For example, "Show One More Level" will display the icons inside the icons in the open folder or file drawer window by selective operation of cursor 42 and mouse 30. Selecting "Show One More Level" again will display the icons within the icons inside the icons in the open folder, as illustrated in FIG. 6.

Each level displayed is indented a bit more than the previous level. "Show One Less Level" will remove the last nested icons from the display. "Show All Levels"

will show all the icons inside of all folders. "Show Top Level" will display just the icons inside the folder or file drawer that was originally opened when opened the first time.

Figure 8:
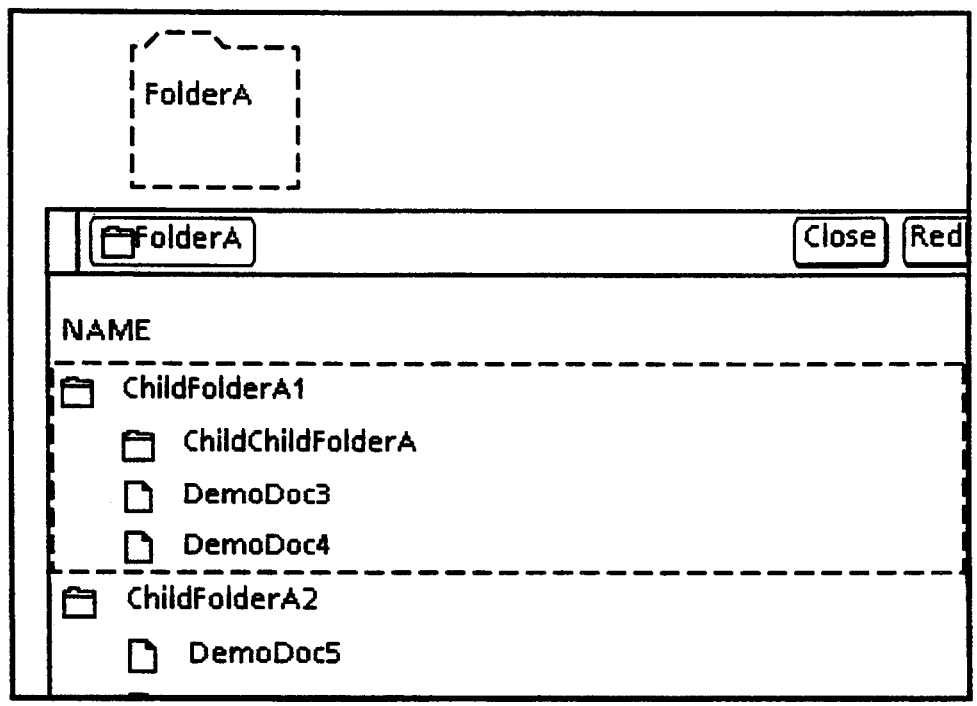
FIG. 8 is a representation of the display of files and automatic selection in accordance with the present invention.

Thus, with reference to FIG. 8, assume the contents of FolderA are initially ChildFolderA1, ChildFolderA2, DemoDoc1 and DemoDoc2. To display one more level, the work station user would move the cursor 42 to the triple bar symbol 41 and click open the pull down menu illustrated in FIG. 5. The user would then move the cursor to the "Show One More Level" position on the pull down menu. This would cause the display of ChildChildFolderA, DemoDoc3, DemoDoc4, DemoDoc5 and DemoDoc6 as shown in FIG. 8. Repeating this sequence for showing one more level would show the complete display as illustrated in FIG. 6.

Figure 7:
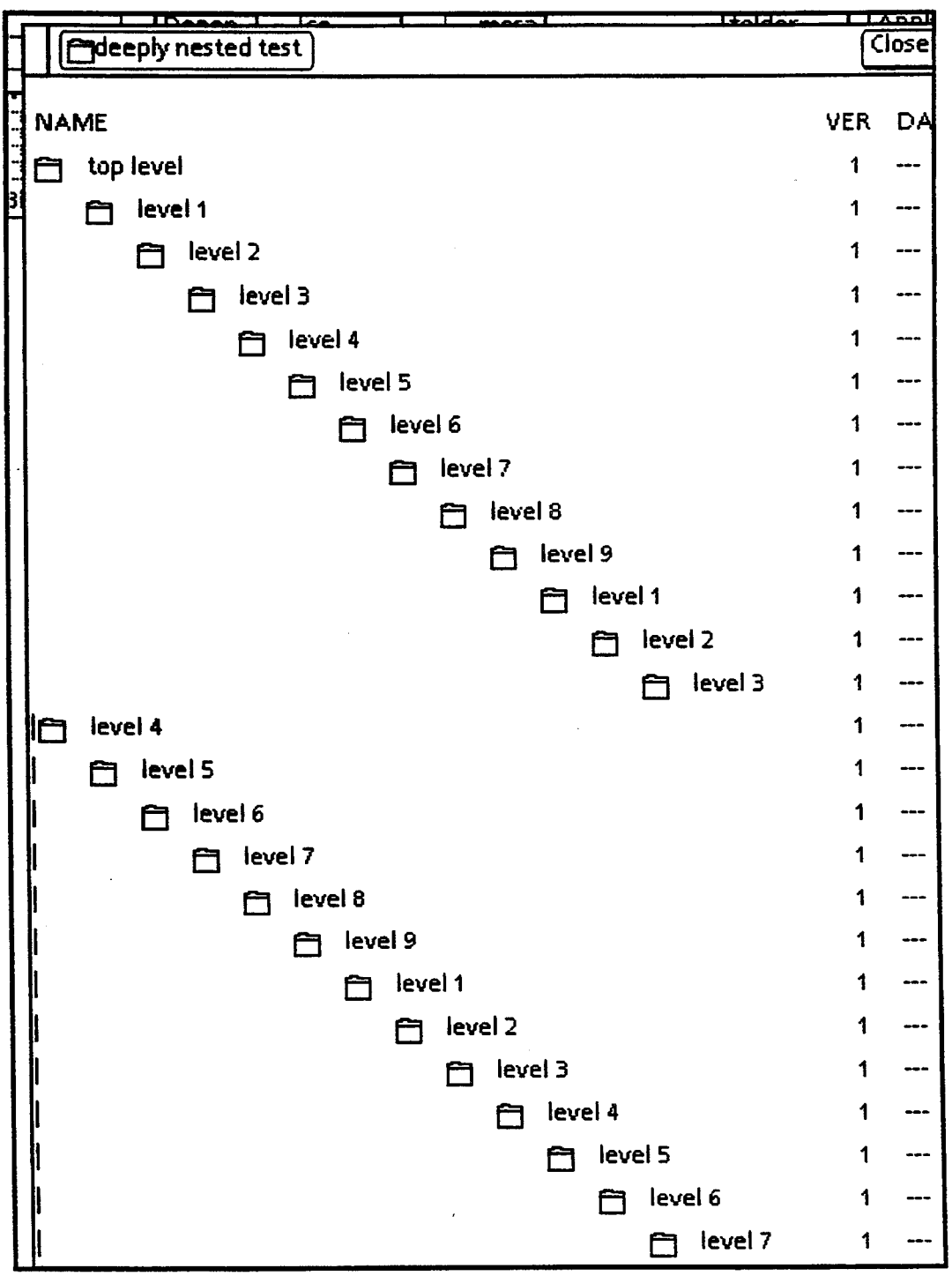
FIG. 7 is an illustration of Display Wrap-around in accordance with the present invention.

Since the icon names at each level are indented a bit more than the previous level, icons beyond a certain nesting level would not fit in the NAME column. This is handled by "wrapping around" and starting over at the left edge, but with a vertical bar character at the left edge to indicate that the level is actually much more than the indenting indicates as illustrated in FIG. 7.

When a folder and the icons inside it are both visible, selecting the folder will automatically select all the icons inside it as shown in FIG. 8. That is, by selecting ChildFolderA1, ChildChildFolderA, DemoDoc3, and DemoDoc4 are also automatically selected. Thus, operations on the folder ChildFolderA1, will also operate on the icons inside the folder. For example, deleting the folder will also delete all the icons inside the folder. Copying or moving the folder will copy or move the icons inside as well.

Figure 9:
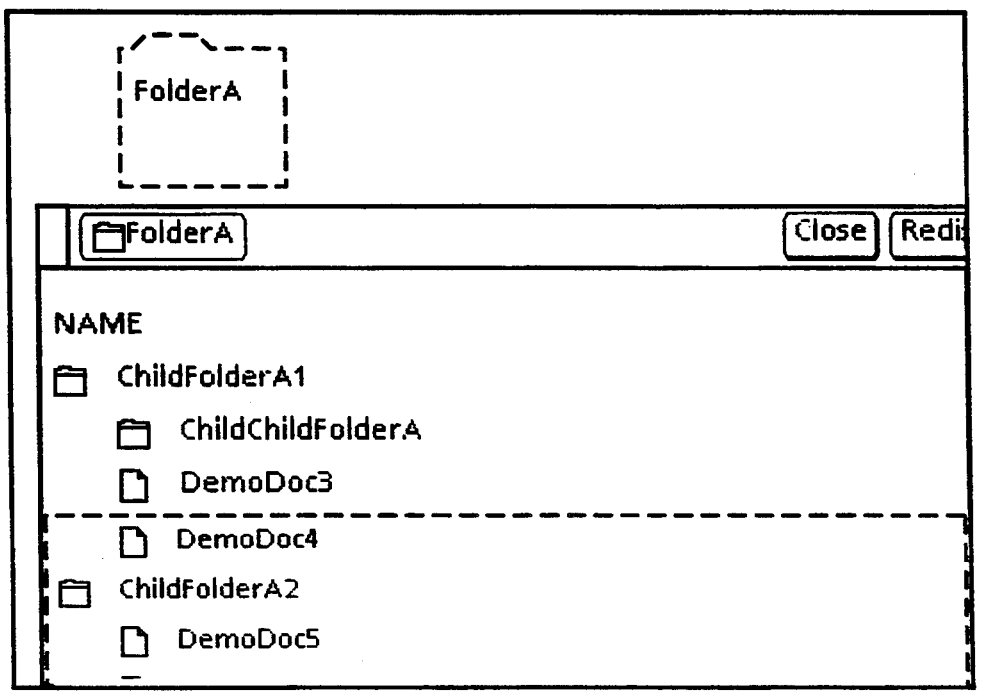
FIG. 9 is another example of file selection in accordance with the present invention.

Any time a folder is included in the selection, all the icons inside it will also be included in the selection. For example, in FIG. 8, if DemoDoc4 is selected, then attempts to extend the selection to include DemoDoc5 will also include ChildFolderA2 and all the icons within ChildFolderA2 including DemoDoc5, as shown in FIG. 9. Note that individual icons that have no other icons showing nested inside them may be selected and operated on as usual. Also, extending the selection within a folder works as usual, for example, selecting DemoDoc3 and extending to select DemoDoc4 would select just those two documents. Note that when a folder and the icons inside it are both visible and the icons are selected, the folder cannot be opened into a separate window (it is already "open"). Also, PROP'S will work normally. When icons are nested so deeply that they wrap around, selection highlighting still works properly all the icons inside a folder are selected with the folder.

Icons can be moved and copied out of a window as usual. Also, as usual, when a folder is moved or copied, all the icons inside it are moved or copied as well. However, the visualization of this type if operation is easier with the nested hierarchical displays of the instant invention. Icons can be moved and copied onto individual icons in a hierarchically nested container display. Icons can also be moved and copied into a hierarchically nested container between items, as usual, but note that the behavior is often quite different from a non-hierarchically nested container display. Some examples will clarify the difference.

Example 1, Ordinary Container Display

To Copy an icon, i.e. New Icon between FolderA and FolderB

FolderA
NewIcon
FolderB the new icon will be inserted between Folder A and

FolderB
FolderA
NewIcon
FolderB

Examples 2,3,4. Nested Container Display.

FolderA
   2 NewIcon
   Folder1 (inside FolderA)
   3 NewIcon
   Folder2 (Inside Folder A)
   4 NewIcon
FolderB To copy an icon to position 2 (between FolderA and Folder1 Inside FolderA), the new icon will be inserted into FolderA, before Folder1 Inside FolderA:

FolderA
   NewIcon
   Folder1 (Inside FolderA)
   Folder2 (Inside FolderA)

Of course, if FolderA is sorted alphabetically from A to Z, then the new icon will appear in its appropriate position. This is true of the examples below as well.

Figure 10:
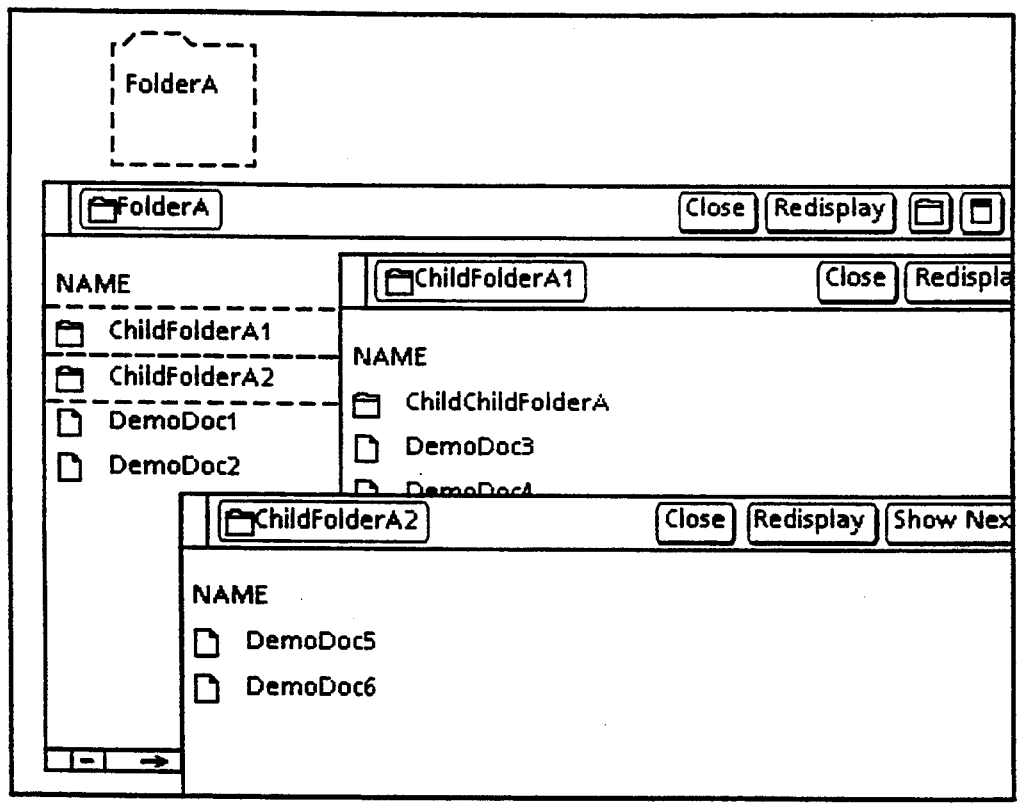
FIG. 10 is an example of Show Next and Show Previous in accordance with the present invention.

To copy an icon to position 3 (between Folder1 (Inside FolderA) and Folder2 (Inside FolderA), the new icon will be inserted into FolderA:

FolderA
   Folder1 (Inside FolderA)
   NewIcon
   Folder2 (Inside FolderA)
FolderB To copy an icon to position 4 between Folder2 (Inside FolderA) and FolderB, the new icon will be inserted into FolderA:

FolderA
   Folder1 (Inside FolderA)
   Folder2 (Inside FolderA)
   NewIcon
FolderB Note that it is within the scope of this invention that NewIcon could be inserted at the same level as FolderA and FolderB. The Folder/File Drawer Display Options sheet now has a new item, "Open Method" with these two choices: "Show All Levels", "Open Within" and "Open Next To", as illustrated in FIG. 10. Selecting "Open Within" means icons open by replacing the window containing the icon. Selecting "Open Next To" means icons will open into a separate window next to the window containing the icon as in FIG. 4. Note that this means several icons in an open folder window can be opened at the same time as illustrated in FIG. 10.

When "Open Next To" is used, the icon that was opened appears "busy" in the original window. This prevents the icon from being opened again, deleted, moved or copied, while it is open as illustrated in FIGS. 4 and 10. If the original window is closed, all windows "Open Next-To" it are also closed, automatically.

"Show Next" and "Show Previous" appear in the window "Open Next-To", and work as expected: the window in which "Show" is selected is replaced with the next icon from the original open folder window.

Figure 11:
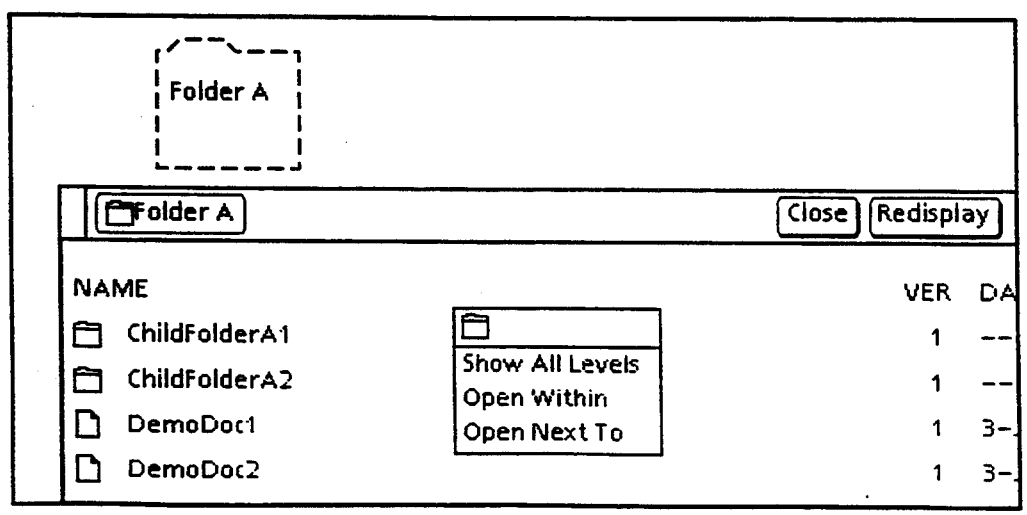
FIG. 11 is an example of the Display Option Sheet in accordance with the present invention.

It should be noted that within the scope of this invention, there are other ways to specify the "Open" method, for example:

(1) The default method can be specified in the User-Profile:
[Folder-FileDrawer)
Open Method: Open Within—or Open Next To (2) Each icon in an open container can contain a pop-up menu with two menu items, "Open Within" and "Open Next To". Selecting the appropriate menu item will open the icon either on top of the folder window, or next to the folder window. The pop-up menu for each icon is obtained by chording the mouse buttons (pressing both at once), or by holding down a shift key while pressing the left mouse button. FIG. 11 shows the pop-up menu over DemoDoc1.

Files or icons can be opened into a separate window rather than having an open icon completely obscure the window from which it was opened as illustrated in FIG. 4. As illustrated in FIG. 4, a first window displays the contents of FolderA, namely, ChildFolderA1, ChildFolderA2, DemoDoc3 and DemoDoc4. This is the same display as shown in FIG. 3. However, if the work station professional desires to display the contents of one of the files or documents in FolderA, for example, ChildFolderA1, the contents of ChildFolderA1 are displayed in a separate window. As illustrated, the file ChildChildFolderA, DemoDoc3, and DemoDoc4 contained within ChildFolderA are shown in a second window offset from the window containing the contents of FolderA.

A FIND capability enables finding of strings, text and icons in a folder display, including forward and backward search and automatic text type conversion based on selection. Text strings or data are extracted from an icon or file and converted to a form that enables the data to be found in the folder display. A typical scenario is to select an icon, position the cursor in the folder, press the FIND key for a find window, and the text name associated with that icon will then be searched for in the folder and highlighted or indicated in some manner if found. The method of finding and displaying files in an electronic workstation includes the step of displaying within the window a plurality of icons and related text representing a hierarchy of files and subfiles stored within the memory. The next step is selecting an icon disposed on the screen, said icon having associated text. Then the find switch is actuated to search and find the hierarchy of files and subfiles for text identical to the text associated with said icon.

Figure 12:
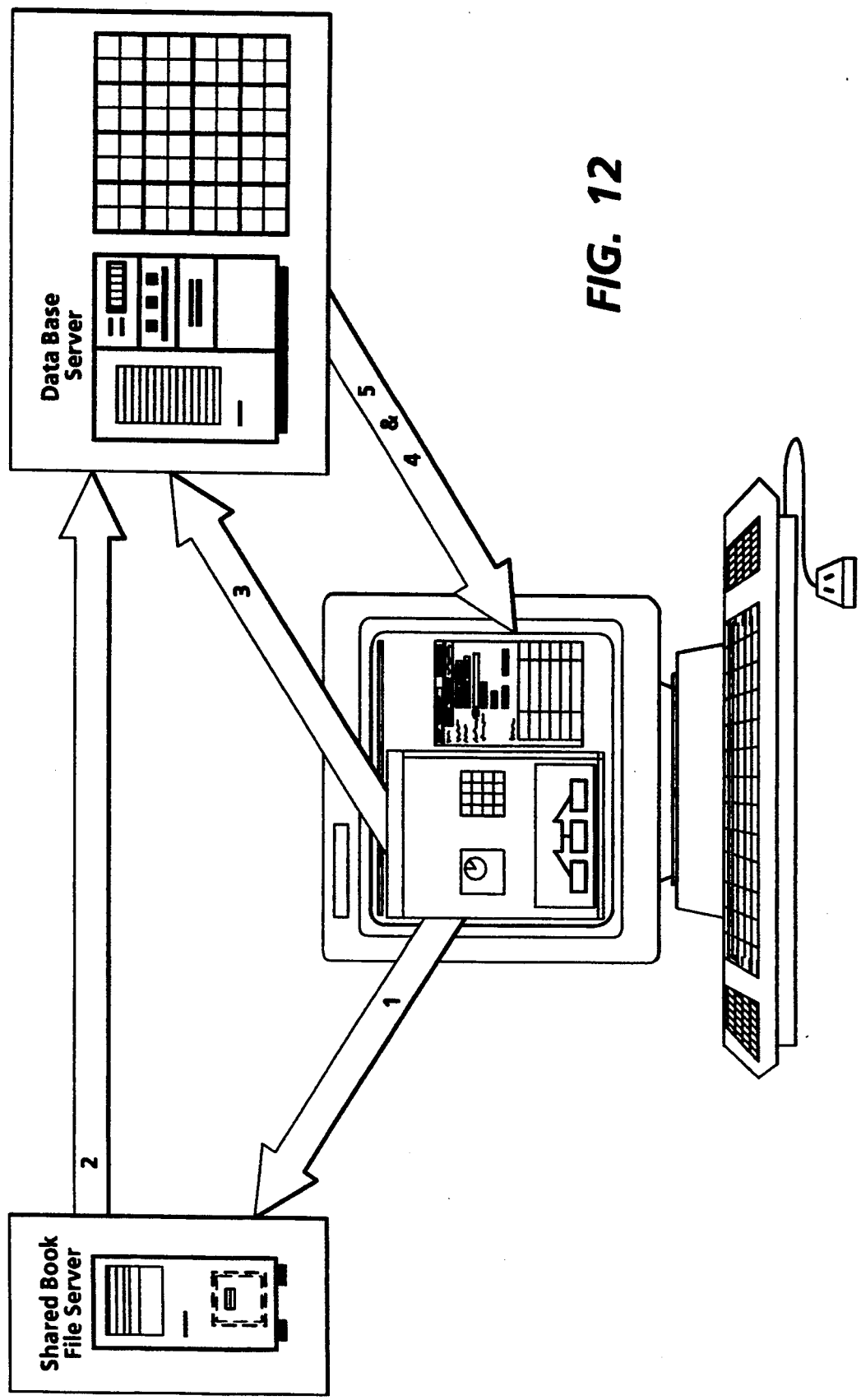
FIG. 12 illustrates a shared data base-backed documents and relationships in accordance with the present invention.

With reference to FIG. 12, there is a general illustration of shared data base and backed documents and relationships in accordance with the present invention In particular, documents are automatically organized and accessed in shared books as shown at 1 and the shared book totally manages the database as illustrated at 2. The document information is data base backed as shown at 3 and the database contents are comprehensively and easily accessed with iconic queries depicted at 4. The query results are capable of being put back into documents shown at 5. The data base server provides information such as tables and fields, project management data, and graphic modeling data. Various presentation graphics are available such as pies, bars, lines, and charts.

A Quick Queries Window describes the Remote Shared Book. It is accessible from all of the Shared Book related entities including the Reference icon to a Shared Book, the Remote Shared Book and the Workstation Shared Book menu header. Quick Queries offers a speedy, iconic method of performing sophisticated cross reference queries effortlessly to obtain much of the data that describes the files, graphics, VP Document Fields and Tables (all maintained transparently on an ORACLE TM Database). Based on these relationships, here is the recommendation to best use these entities: The File Drawer stores exclusively the Remote Shared Book. It is recommended that the name Library be appended to the file drawer name to indicate the purpose of the drawer. The Reference to a Shared Book is Used for mailing to others and as entries in Reference Books. Open Quick Queries from this icon to save space on the desktop (instead of keeping the Workstation Shared Book on the desktop). The Remote Shared Book is used to make Reference icons (by using Reference Selected Version or Reference Last-Filed Version menu commands in the window header). Quick Queries is used for Accessing Quick Queries from any of the Shared Book entities. It performs sophisticated queries across many books and many types of information as required.

Figure 13B:
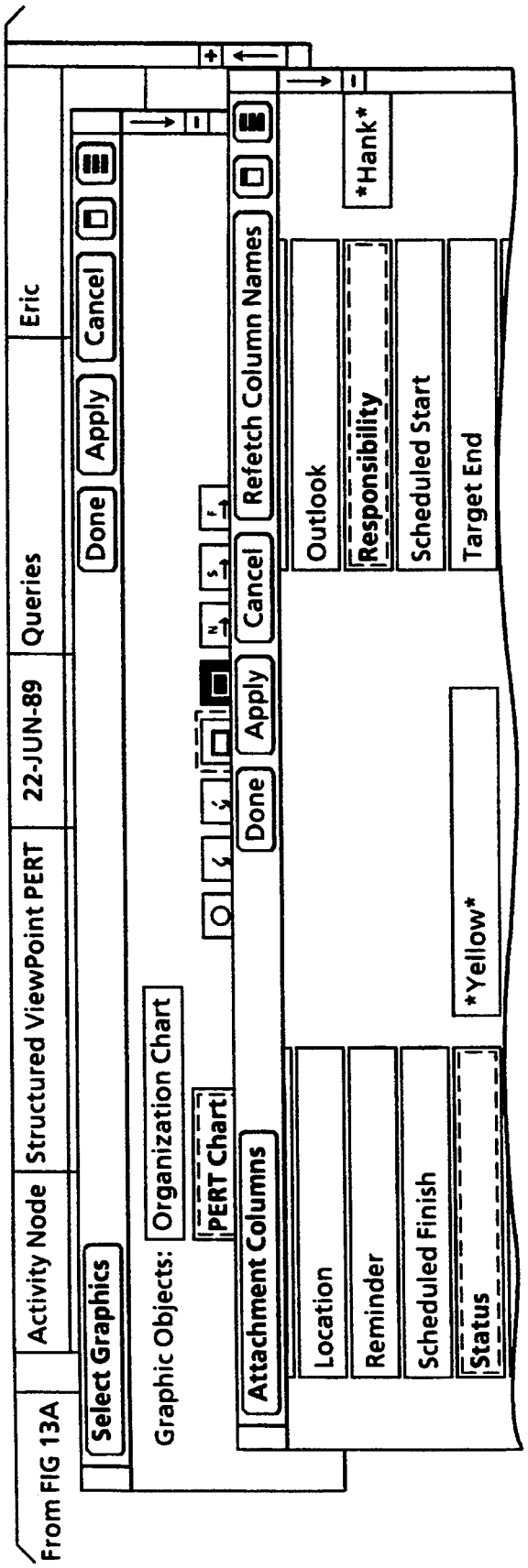

FIG. 13 shows the Quick Query window data qualifications that compose a query that extends across these block types of data. To show all of the File names AND who they were Modified By AND for PERT/CPM Activities OR Milestones AND those that Hank's Responsible for AND what the Status of those that are YELLOW, the icons are simply turned on by clicking over the item and then entering qualifying data in each of the text item fields. This constitutes the query statement sentence above. The appropriate data is returned per that specification. Actually you are allowed to qualify your queries with the wildcard * and the comparison operators=, < >, >, > =, BETWEEN . . . AND . . . , , In (list) LIKE, IS NULL, and the negation of the last four operators using NOT: NOT BETWEEN, NOT IN, NOT LIKE and IS NOT NULL. Once you are at a level where you are querying a Shared Book that contains ViewPoint Documents, you may query the contents of the ViewPoint documents very quickly. One can specify those potentially complex queries simply by selecting the appropriate Quick Queries information group (graphic) icons in the top of the Quick Queries Window. At any point you can always Open or Print the actual document itself from the Shared Book to examine its contents.

Figure 14:
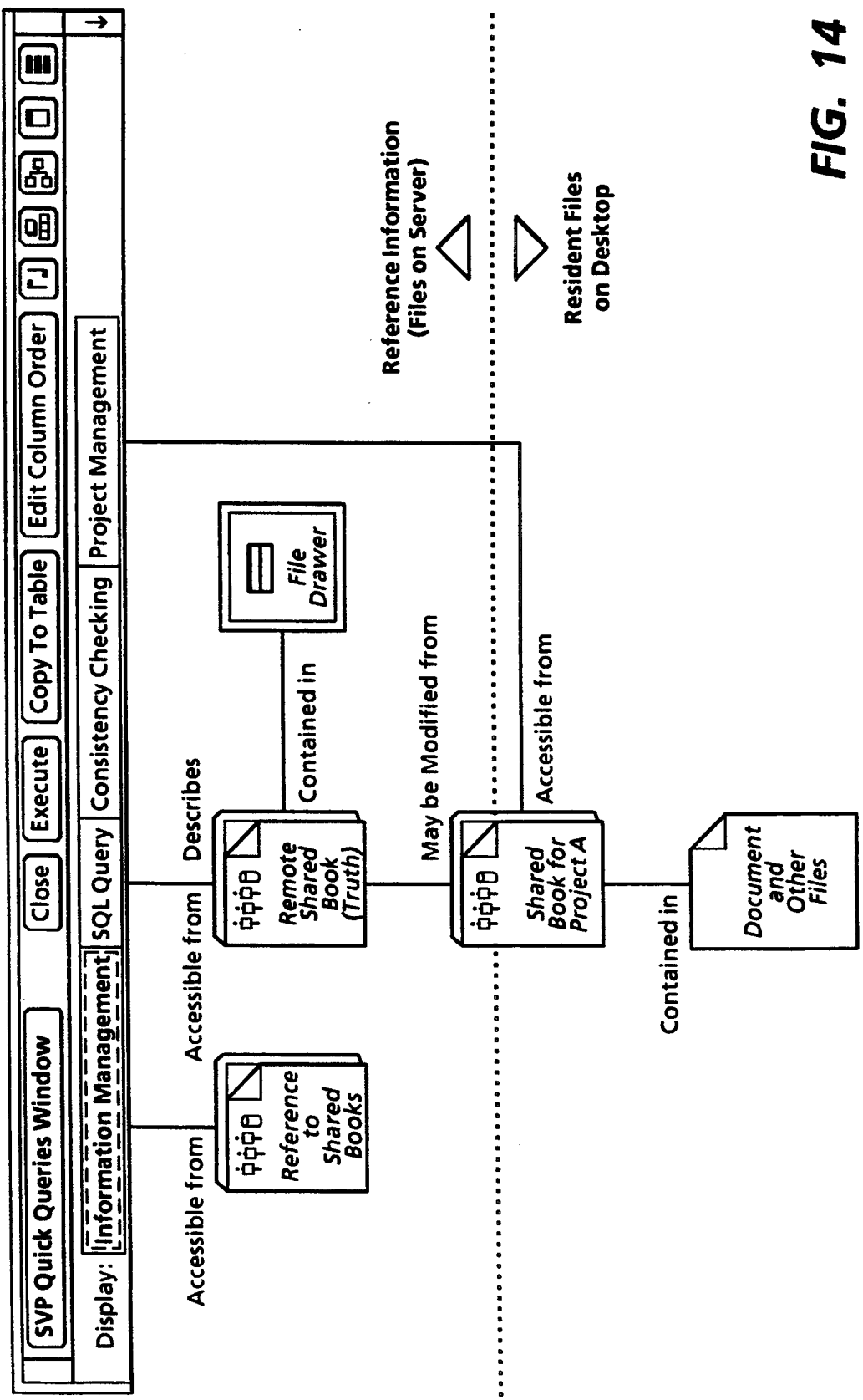
FIG. 14 is a representation of the relationship of Shared Book Objects in accordance with the present invention.

FIG. 14 describes the relationships of Shared Book entities. It is important to observe the location of where the actual real shared information exists (these are the icons with black borders) and the relationships of the rest of the entities to them to understand exactly what type of information one is looking at with each of the entities. The file drawer and the Reference to a Shared Book are pointers to files on a File Server—they occupy 0 disk pages on a desktop. In contrast, the Remote Shared Book on the file server, is all content.

The Workstation Shared Book is not really a reference icon and not really a resident icon like a document—it is somewhere in the middle. When one opens a Workstation Shared Book icon, what is on the remote server is being looked at and considered the truth. After locking a file in the Shared Book Window and then opening it, the file(s) will be copied from the server to the workstation. After closing the document the Status column in the shared book window will indicate that it is local with the small terminal icon; a black lock will show that it is locked by you and a plus sign will indicate that it is more recent than the truth on the server.

One can determine that exact status of each of Shared Book Entries from this window with respect to Remote Shared Book.

To create a SHARED BOOK WITH DATA BASE, in a specific embodiment, it is necessary to obtain a Blank Book Icon from the Directory, Press Props—A property sheet will appear. Fill out the property sheet illustrated in FIG. 15 as follows: 1. Point into the "Name" field. Fill in the Name that you want the book to have. 2. Select "Sorted" or "Unsorted". If "Unsorted" is chosen, continue with step 3. If "Sorted" is chosen: Two additional fields will appear. Select "Name" or "Version Date". Select the method of sorting; "A-Z" or "Z-A"3. Press the "NEXT" key. In the field "Notes:" fill in any Notes that will be helpful to others about the use of the book or anything else that is important to it's readers or developers. 4. Press the "NEXT" key. Following the format in the Attention menu at the top of the screen. Format for Remote Location: (Server:Domain:Organization) File Drawer/Directory . . . fill in the Remote Location with the server location where the book's contents will be stored automatically. 5. Press the "NEXT" key. Select either: a) the "Keep All Versions" field or, b) the "Limit Number Of Versions To Keep" field and, following the format in the Attention menu at the top of the screen, fill in the number of versions of files that will be allowed to exist on the server at one time. The Shared Books application will automatically delete the oldest versions of any file with more versions than the number you specify. 6. Press the "NEXT" key. The following message will appear in the Attention menu at the top of the screen. Format for Database Services Database, Name:Domain:Organization. Fill in the Database Name with the name of the Network name of the Data Base Service you will be using. See system administrator for details. 7. Press the "NEXT" key. Fill in the Host Logon Name with the VAX computer account name. 8. Press the "NEXT" key. Fill in the Host Password of the VAX TM computer account 9. Press the "NEXT" key. Fill in the Database Logon with the ORACLE TM account name on the VAX TM . 10. Press the "NEXT" key. Fill in the Database Logon with your ORACLE TM password for the ORACLE TM account name on the VAX TM 11. Press the "NEXT" key. Fill in the Limit Retrieved Rows To field to the number of rows displayed at one time during a Quick Queries session. 12. Press the NEXT key. Fill in the Display (number of) characters of LONG data types with the number of characters retrieved by default in the Quick Queries operations. A lower number will increase performance. 13. a) If "Limit Number Of Versions To Keep" was selected in Step 5, continue with Step 14. b. If "Keep All Versions" was selected in Step 5. An additional field will have appeared. This selection controls the versions that will be sent to the data base. Select "All Versions" or, Select "Latest Version Only". 14. In the field "Send ViewPoint Document Fields To Database", select "Yes" or "No". Selecting "Yes" sends the Fields in the Document to the database so that the information contained in the fields will be available for performing "Quick Queries". 15. Select "Done" to initiate the Books creation or, Select "Cancel" to cancel the operations. (See FIG. 7.) The Shared Book with Data Base will be created, automatically, on the desktop as well as at the server location and on the Data Base Service. FIG. 15 illustrates one reference book. To Create a Reference to a Book: 1. Open up the appropriate Drawer to see the Shared Books on the server. 2. Select the book created and select "Reference Selected Icon" in the menu header. A reference icon will appear on the desktop. 3. Put that reference icon in the Reference Book User privileges require that one gain simple access rights to information located on servers. These access rights provide the protection for your libraries content. User privileges .are based on NS Filing Access rights. One can control access to any entry or the book itself as required for one application. There is a choice of: Read;Write; Add/Delete;Change; Access; attributes. For controlling access to the entries, select an entry and selecting the Show Details in the Shared Books Window Header. Then click on the access you require, select CHANGE ACCESS LIST and then DONE for the property sheet. Note: Since Shared Books are hierarchical, one can now allow access to branches of files by changing the access to a folder. All "children" of that folder will inherit those access rights. For controlling the access to the Shared Book itself, one must already have "Change Access" rights. One may change access two ways—by pressing PROPS from a closed icon, or selecting SVC Book Properties" from the Shared Book icon in the Shared Book window header. At the present time, user privileges to the data that is part of Quick Queries exists on an ORACLE TM Database on a VAX TM computer on the net. This is automatically made the same as the Book's Read access list.

While organizing ViewPoint files has seldom been considered a significant problem since the data in them is terminal, organizing the data that is extracted from them deserves prior planning since its use may be just beginning. Here are categories of data extracted from files (automatically and transparently) when they are checked into Shared Books. These include: NS Filing—A part of every file; tructured Graphics (and relationships)—Names of objects and connections and their relationships; CASE—Graphic Modeling;Project Management—Worldbreakdown and PERT/CPM Chart Graphics; Graphics Data Attachments—records of data associated with each Graphics Objects; ViewPoint Fields—one instance of each fields and it's data per document; ViewPoint Tables—effectively multiple instances of VP Files in a document. To determine what data should be a part of each book, examine and limit the specific purpose or application of each book.

The use of Workstation Shared Books requires only the understanding of a few menu commands to enable successful controlled sharing of information created. After opening the Shared Book window three commands enable successful use of the system:Lock—allows exclusive rights to modify a file, Check in—updates the "truth" in the Remote Shared Book after you have opened and modified your files, Unlock—releases rights to modify a file and deletes the local copy of the file on your desktop. The files in the Shared Boole view the remote Shared Book. They are what is presently on the file server. One may always read the files on the Remote Shared Book even though someone has it locked and may be modifying it.

The Status column indicates if the file is locked with a "Lock" symbol (by you or anyone else); if it is local with a small terminal (it must be locked by you first) and with a "+" if the version on the desktop is more recent than the files on the Remote Shared Book. Normally these icons are black. If a locked icon is gray, it has a modified meaning. If the terminal is gray, someone else has the file locked, or you have checked a version of this file on another workstation that is more recent than the one you have locally. A gray "+" indicates that the display has not updated to allow a check for the version on the desktop being more recent than the files on the Remote Shared Book.

A reference is effectively a pointer to the Remote Shared Book. References have a number of useful purposes: They are ideally suited to be mailed to another since they do not take up any space on a workstation and are effectively pointers to the actual information. The Quick Queries menu item appears in the window header of every Reference Icon to a Shared Book with database allowing one to quickly execute complex queries iconically from the Reference to Shared Book. One need not care where the actual database that will be queried is located. One will be automatically logged on and ready to find the information that is sought. Since the Reference icon opens to a Show All Levels display, one sees directly the full listing of a Shared Books contents. Reference icons are made by opening the file server to the Remote Shared Book and selecting Reference Selected Version or Reference latest Version.

Quick Queries provides a speedy simple iconic method of flexible cross referencing and accessing of data that is part of files. It's easy to use since the SQL (Standard Query Language) is generated based on the icon selections across many books and many types of information contained in those files. Since the ORACLE database that Quick Queries uses is record oriented, applications that use tables or information or that have their output data organized as tables are best suited for Shared Books.

The information available for query is separated into blocks that correspond to types of information within ViewPoint Documents. This presently consists of filing Attributes e.g. File Name, Modified By, Modified On etc.; SVP Graphic Object Types e.g. PERT/CPM Chart Milestones and Activities or Data Flow Diagram Data Transformations or Data Stores. For Graphic Data Attachments, this may consist of columns of data that supplement the objects for which they are attachments. For PERT Chart activities, Responsibility and Location may be two types of data that support the activity. ViewPoint Fields may hold required data for documents in formats. ViewPoint Tables are treated as multiple VP Fields in a View Point Document.

Figure 16:
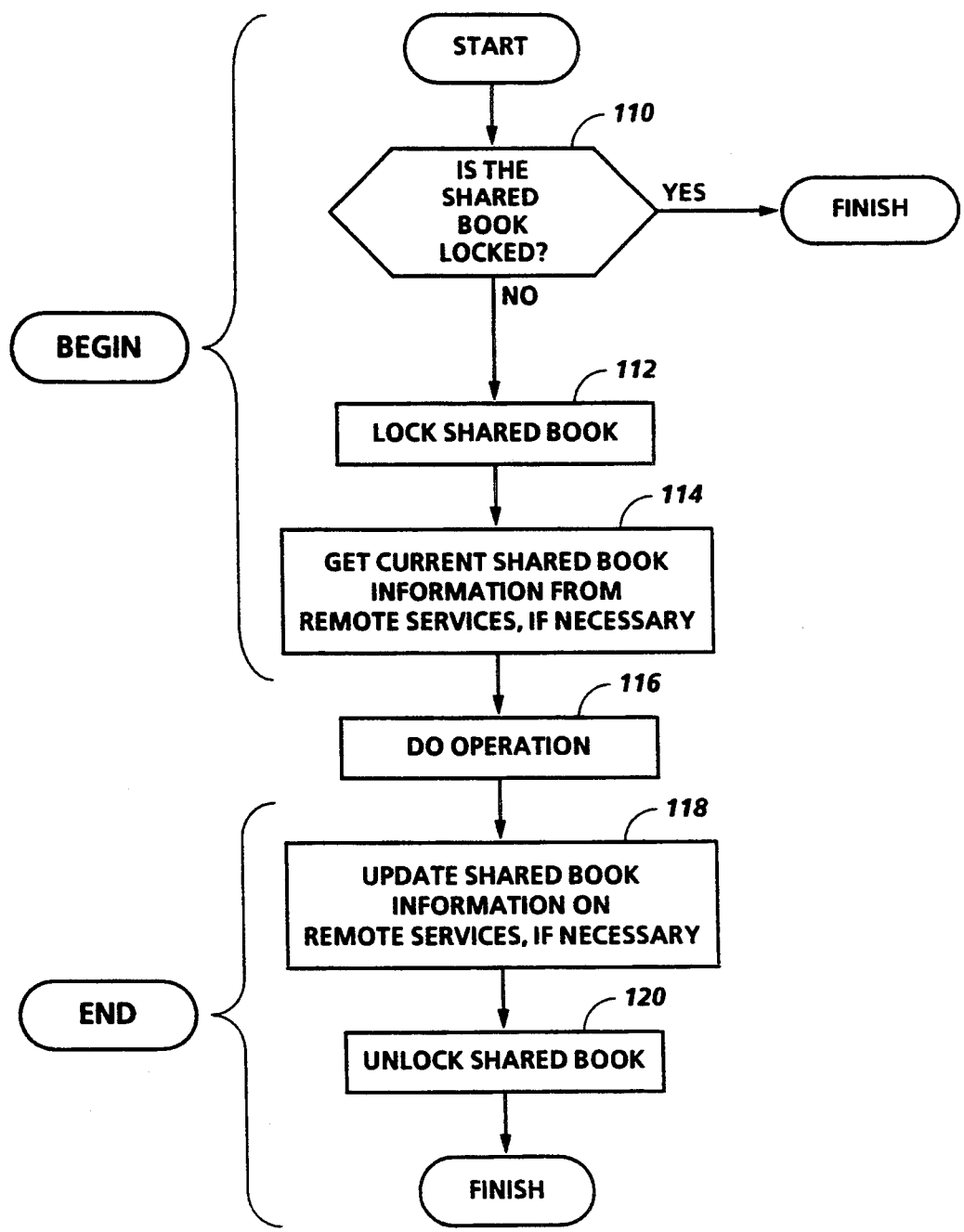
FIGS. 16, 17, and 18 are flowchart representations of the locking and unlocking procedures of shared objects of this invention.

The logic for creating a query to ORACLE is based on an AND logical relationship between each block type of information. An AND logical relationship also exists inside each of the blocks of information except for the Graphic Types and Relationships which are the same object icons that are available to be drawn in Graphics. The relationships between these objects are logical OR's. Although not shown, multiple Shared Books can be queried with an AND logical search criteria across many books. In FIG. 16 there is shown a flowchart which represents the basic transaction occurring during each instance of a Shared Book with Data Base operation, i.e. upon user invoked operational commands on a Shared Book 40, wherein such an operation has a requirement or need for current shared book information to properly implement the operation. The transaction of FIG. 16 is carried out to completion from START to FINISH with performance of the invoked "Do Operation" at 116. The transaction of FIG. 9 can be divided, for convenience, into a BEGIN portion and an END portion. The begin portion updates the local copy of shared book information if necessary. The end portion updates the remote instance of a shared book data file, if necessary, by copying data from workstation 14 to the remote files services. Encompassing these updating functions is the locking and unlocking the shared book's lock. The BEGIN portion is represented by functions 110, 112 and 114 and the END portion is represented by the functions 118 and 120.

In this connection, the implementation for shared books provides arbitration of access to the remote shared book data by using a lock on the shared book. The lock is implemented by the database service and is available over the network. In this manner, any user invoked operation that requires up-to-date shared book, data, or could possibly effect data changes, such as opening a shared book, opening an entry, opening the shared book property sheet or opening a shared book Details property sheet, locking a particular entry, copying a shared book entry to desktop or copying an entry from desktop back into shared book, causes the implementation to acquire or attempt to acquire a lock on the Shared Book will Data Base. If successful, the command is allowed to proceed and the lock is held on the shared book for the duration of the execution of the command, after which the shared book is released. Otherwise the user is informed that the shared book is currently in use and displays the name of the other user that presently has shared book locked. Otherwise, the user is informed that the shared book is currently in use and displays the name of the other user that presently has the shared book locked.

Locks are specified for the shared book per se or for an entry or entries. The former control is invisible to the user and the latter control is invoked by the user and is visible to all users in their user interface representation. The former provides for consistent and continuous serialized updating of the shared book representation while the latter gives a user exclusive right over an entry, usually for the purpose of entry modification. It should be realized that the Shared Book with Data Base is locked only during execution of an operation command and the lock, therefore, is usually "short living", i.e. milliseconds or seconds or minutes, whereas entry locking occurs manually by a user which will remain indefinitely or at least until invoking of a "Save" command on an entry or explicitly canceling the lock and, therefore, is "long living", i.e. minutes, days or even weeks. The purpose of the shared book lock is to maintain consistency in updating information about a shared book without processing further updating information from another shared book implementation so that updates to a shared book's data file are serialized by transparently acquiring its lock. Once the lock is released, another implementation is free to acquire the shared book lock via the next user invoked operation command.

Upon a user invoked operation command, the implementation will conduct a transaction with the remote database service to determine if the shared book is locked, as indicated at decision box 110. If the shared book data file is locked, the task is finished, i.e. aborted, and the user is encouraged to try again. If the shared book data file is not locked, then the shared book is locked, as indicated by box 112. Next, the current shared book information is obtained from the shared book data file, if necessary, i.e. the information, as updated, pertaining to the current list of entries of the shared book and the fields of records pertaining to shared book window, the shared book property sheet and each shared book entry property sheet. This function is represented by box 114 in FIG. 16. After information updating of the local instance of the shared book user interface representation, the task originally invoked by the user is processed, as represented by the "Do Operation" of box 116. This task, that will invoke the transaction of FIG. 16, will be an operation at the entry level, such as, opening an entry, copying an entry, opening an entry Details property sheet or locking an entry paginating one or more entries or printing one or more entries on the shared book. There are also some operations relative to the shared book entity per se, such as, opening of a shared book icon, opening the shared book property sheet, copying an entry into or out of the shared book, or paginating the shared book or copying the shared book to the printer icon, that will invoke the transaction of FIG. 16.

The next function to occur in the transaction of FIG. 16 is an updating of shared book information, relative to the local instance, to the remote file service, i.e. to the remote shared book data and database files. This is represented by box 118 in FIG. 16. Thus, any local changes to information relating to the shared book, for example, addition of a new entry to a local instance of shared book or invoking a "save" command on an entry, will be updated to the remote shared book, after which the shared book lock is removed, as indicated at box 120. The transaction is thus completed or FINISH.

Figure 17:
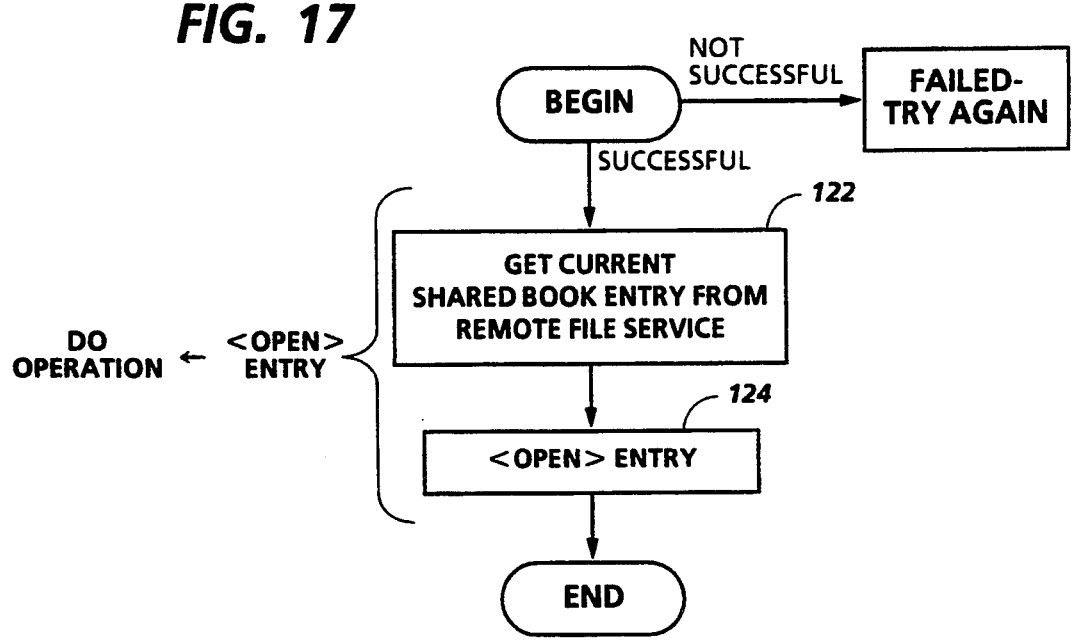
Figure 18:
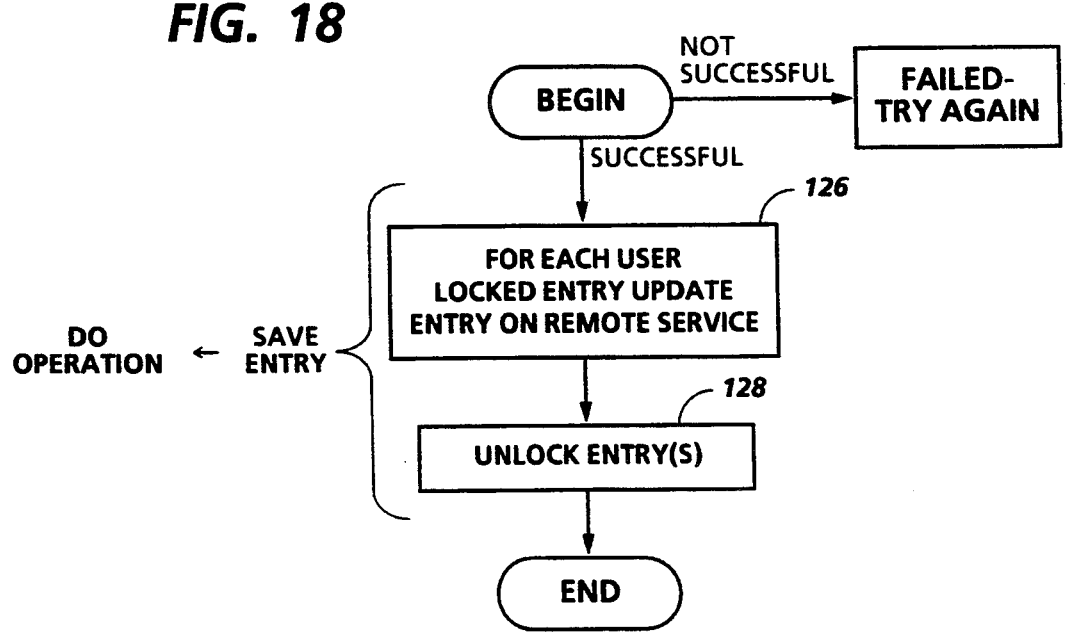

Examples of user invoked operations are shown in FIG. 17 and 18 relative to an already selected entry. FIG. 17 represents the entry level operation for opening an entry, via the <OPEN> command, while FIG. 18 represents the entry level operation for saving an entry. In FIG. 10, if a user has opened shared book window and selects an entry and thereafter invokes an <OPEN> command from keyboard 25, the BEGIN portion of transaction of FIG. 9 is initiated, determining the locking state of the shared book data file at 110 and, upon obtaining that lock at 112, updating the local instance of its representation at 114.

At this point, the "Do Operation" 116 is performed, which, in the case here, is the opening of an entry. Some operations, such as, opening an entry, copying an entry out, entry details, ensure the user has made a correct selection by aborting at this stage if the local shared book data was indeed updated at box 114. If at box 114 new data was not actually retrieved because there was no new data to report, these particular operations proceed as invoked. A check is made to determine if a local cache of the entry exists and, if not, the current version of the entry is obtained from the remote file service. On the other hand, if a copy of the entry exists at the local instance of the shared book, then a check is made to determine if the local instance is up-to-date, i.e., if the version at the remote file service has a later creation date than the locally cached version. If true, then the implementation will have the copy of the more recent version on the remote file service replace the local copy of the entry. This functioning is indicated by box 122 in FIG. 17. Next, the up-to-date entry is opened, which is represented by box 124 in FIG. 10. The "Do Operation" 116, having been completed, the END portion of the transaction of FIG. 9 is completed with updating of the remote instance of the shared book representation, if necessary, at 118 and the unlocking of the shared book data file of the representation at 120.

It is of side interest relative to this Open Entry example of FIG. 17 to note that if the user had not previously invoked a Lock Entry operation, the above opened view of the entry in some cases would be a read-only version, i.e. not editable.

In FIG. 18, if a user had locked and/or edited one or more entries of the shared book and desires to update the remote instance of the entry or entries 44, the user may invoke a "Save" command from header of shared book window, as will be explained in greater detail later. This action invokes the BEGIN portion of transaction of FIG. 16 and a determination of the locking state of the shared book at 110, followed by hopefully the successful seizure of the lock at 112 and the updating of the local copy of its representation at 114, if necessary. At this point, the "Do Operation" 116 is performed, which, in the case here, is the saving of an entry. For each entry that has been locked by the user, the entry is copied to the remote file service providing an up-to-date remote copy of the entry. This function is represented by box 126 in FIG. 18. After "Save" function is performed, the saved entry or entries are automatically unlocked by the implementation because an entry "Save" operation connotes the completion of the task of entry modification. This is represented by box 128 in FIG. 18. The "Do Operation" 116, having been completed, the END portion of the transaction of FIG. 16 is completed with updating of the remote instance of the shared book representation, if necessary, at 118 and the unlocking of the shared book data file of the representation at 120.

It is of side interest relative to this Save Entry example of FIG. 18 to note that if the user had not previously invoked a Lock Entry operation, the entry or entries would not be saved by copy to the remote file service. Again, to maintain consistency of the current state of the shared book, the shared book cannot be undergoing changes or updating by another user concurrently with the attempted "Save" operation by the instant user and represent a current state of a shared structured data object viewed by multiple users at different workstations.

An important point represented by these two examples is that a shared books data file and records are locked so that no other user can change the status of the shared book while the locking user is changing its status or the status of one or more entries, such as, by updating via the "Save" command.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

We claim:

1. A method of managing shared structured data in a multi-user collaborative system that integrates a filing system for storing the shared structured data and a relational database for querying the shared structured data whereby the file system and the relational database can be concurrently accessed and queried by multiple users at a plurality of networked workstations, comprising the steps of displaying at each workstation the shared structured data including data relative to any related structured data therein, the step of displaying including a visual indication of activity occurring at other workstations affecting the contents of the shared structured data, modifying the contents of the shared structured data, updating the file system with any modifications to the content of the shared structured data, and automatically populating the relational database with modified shared structured data that has been translated into a relational format, the step of populating being concurrent with the step of updating the file system.

2. The method of claim 1 wherein said displaying step further comprises the steps of locking the shared structured data, said locking step providing mutual exclusive access to the shared structured data and translated relational data, and changing the visual indication of activity on each workstation to alert user of any shared structured data with mutual exclusive access in response to said locking step.

3. The method of claim 1 including the step of, querying the relational database to search for information within the contents of shared structured data, the step of querying including displaying results at any of the plurality of networked workstations upon completion of the updating and populating steps.

4. In a electronic workstation device having a keyboard and display screen desktop, the workstation being electrically interconnected to a remote shared file system and shared relational database for respectively storing and querying shared structured data composed of structured data objects and translated relational data, the screen display desktop being provided with a plurality of window options for access to the shared data through the use of screen icon representations, the shared file system, the shared relational database and the workstation device combining to provide a metaphor for accessing the shared data stored in the file system and the translated relational data in the relational database, a method of access to the shared data and relational data comprising the steps of:

entering a quick query access mode, selecting an information management window to provide a plurality of structured data object related prompts and filing attribute prompts, providing search text for the information query, initiating a common search of the relational database according to selected graphic symbol prompts and search text, displaying results of the searched shared relational database in a results table on the display screen, the shared data displayed in the results table being accessible from the shared file system.

5. The method of claim 4 including the step of preventing access to selected shared structured data that has acquired mutual exclusive access by other users.

6. A method of operating a multi-user collaborative system having a file system for storing shared structured data and a relational database for quickly accessing converted shared structured data, the file system and the relational database being concurrently accessed by different users at a plurality of workstations, comprising the steps of displaying at each workstation a representation of the shared structured data including data relative to any related structured data queried from the conversions thereof, the step of displaying including in said representation a status indicative of activity occurring at other workstations affecting the shared structured data, and providing an inquiry means to the file system through the relational database, said inquiry means tracking said entries as accessed and modified by respective users concurrent with said file system posting the status thereof in said representation at any workstations upon user completion of modification to any of said entries when a user invokes an operation relative said other workstation representation.

7. A multi-user collaborative system integrating shared structured data and relational data in a network environment, comprising, a shared file system for storing structured data, a relational database for storing relational data, disposed remotely of said shared file system, a plurality workstations, having remote access to said file system and said relational database, said workstations including means for creating structured data, means for automatically translating the created structured data into relational data, the created structured data and the relational data being concurrently stored in the shared file system and the relational database respectively.

8. A multi-user collaborative system according to claim 7 further comprising, means for collaborative access to the stored structured data in said shared file system and the translated relational data in said relational database from the plurality of workstations, the access means integrating both means for querying the relational database and means for viewing the shared data hierarchically.

9. A method of integrating a multi-user collaborative system having a plurality of networked workstations, comprising the steps of:

creating shared structured data on the networked workstations;

translating independent from the creating step the shared structured data into relational data;

concurrently storing the shared structured data and the relational data, the storing step providing collaborative access of the shared structured data and the relational data to multiple users.

10. The method of claim 9 including the step of, querying the stored relational data, said querying step and said creating step collaboratively providing access to shared structured data referenced by said query step.

* * * * *